Jan. 29, 1952 L. J. KMIECIK 2,583,952
FLUID LEVEL RESPONSIVE DEVICE
Filed Oct. 4, 1949 2 SHEETS—SHEET 1
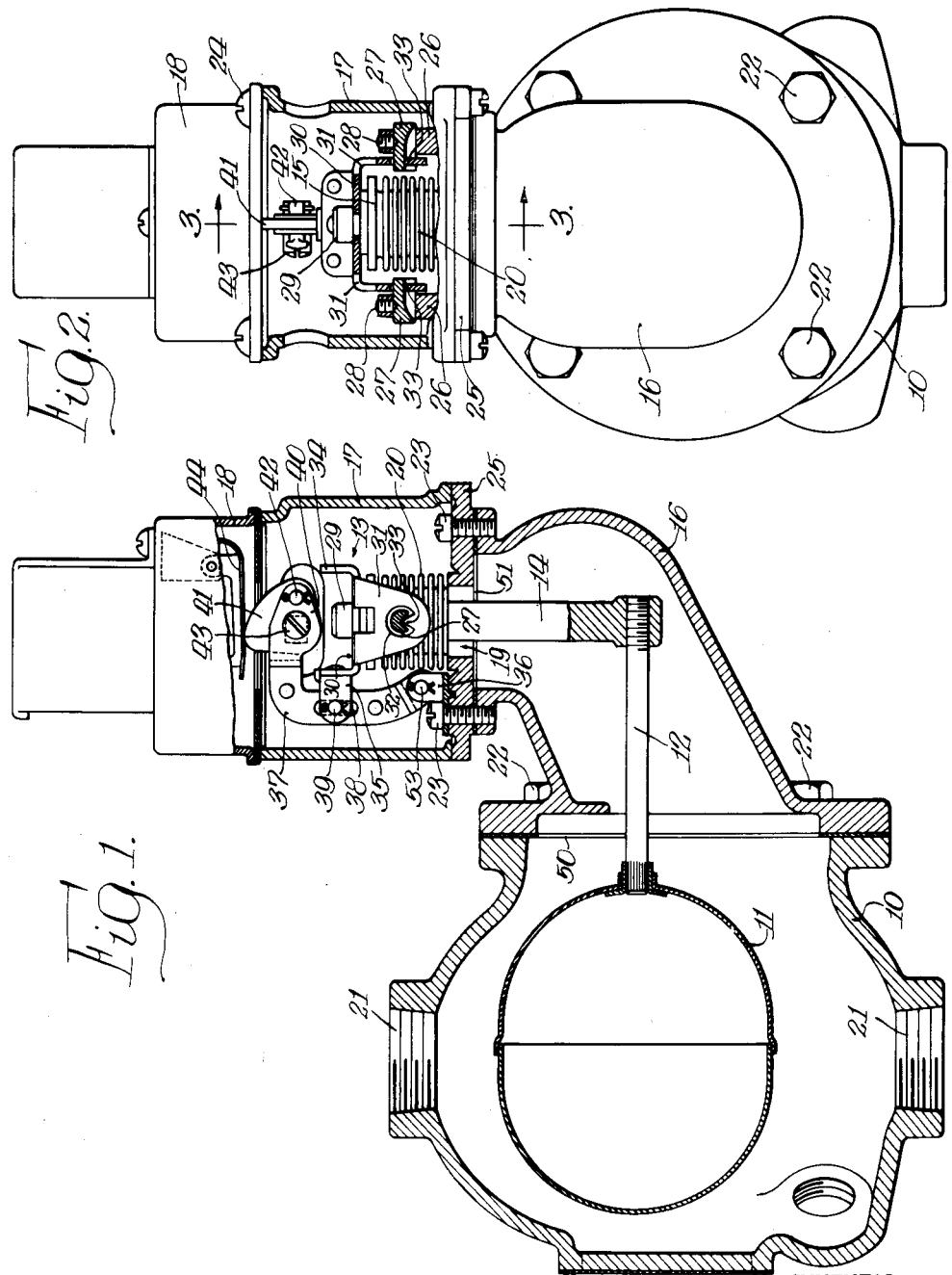
INVENTOR.
Leopold J. Kmiecik,
BY Brown, Jackson,
Boettcher & Dienner
Atty's.

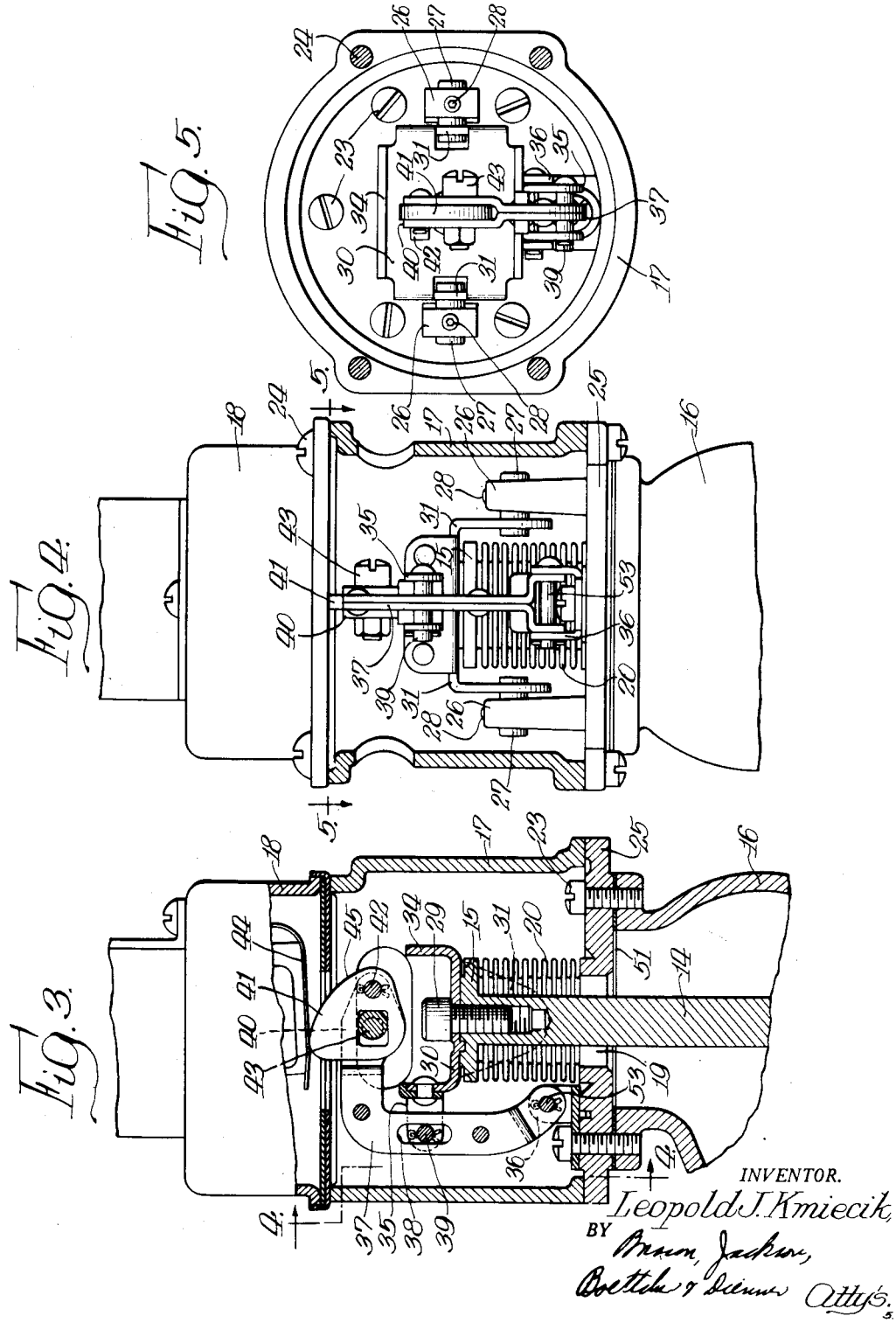

Patented Jan. 29, 1952

2,583,952

UNITED STATES PATENT OFFICE 2,583,952

FLUID LEVEL RESPONSIVE DEVICE

Leopold J. Kmiecik, Chicago, Ill., assignor to McDonnell & Miller, Inc., Chicago, Ill., a corporation of Delaware Application October 4, 1949, Serial No. 119,514

7 Claims. (Cl. 200—84)

1

My invention relates generally, to fluid responsive devices and it is particularly directed to a device which is responsive to changes in liquid level.

It is well known that serious damage may result to a boiler used, for example, to generate hot water or steam for domestic heating purposes, if the water level therein falls below a safe minimum when the boiler is in operation. If the boiler is of a type having water tubes and the water level falls too low, the tubes become overheated, which may cause them to "burn out." Obviously such damage is costly and therefore the water level in the boiler must be checked periodically and if the level is below the safe minimum, make-up water must be added or the fire extinguished, until such time as water may be added.

I propose to provide a device for use in connection with boilers or similar equipment, which device, when the water level in the boiler falls below a predetermined minimum, will actuate a switch. The switch may be adapted to open or close the electrical circuit of a makeup water pump or of a condensate pump, and thus the flow of water to the boiler may be controlled automatically. In this manner, a constant level of water may be maintained in the boiler for the proper and efficient operation thereof. If a makeup water pump or a condensate pump are not present in the heating system, or if it is undesirable to control them automatically, the switch may be adapted to open the electrical circuit to a blower for an oil burner, if oil is used as a fuel in the boiler, in which case the fire may be automatically extinguished. If a forced draft fan is provided to increase the rate of burning of the fuel in the boiler, the switch may be adapted to stop the fan when the water level drops too low, thus decreasing the rate of burning and decreasing the extent of damage to the boiler.

Devices of this character have been constructed before. However, because of the nature of the seal between the float chamber and the mechanism associated therewith, the devices have been responsive to changes in fluid pressure as well as to changes in liquid level, which in some cases has caused premature or unnecessary actuating of the switch due to the fluid pressure. This results in the water level rising too high or of the fire being unnecessarily extinguished, depending

2 on the nature of the equipment to which the switch is connected. Furthermore, when the pressure rises excessively high, a change in liquid level is not as effective in actuating the float responsive mechanism to the same degree as when the pressure is normal because of the increase in friction between the moving parts which are under the influence of the high pressure.

In previous devices, wherein a cam surface has been provided between the float responsive mechanism and the switch, jamming of the cam surface against the switch has frequently occurred, thus necessitating the dismantling of the device for repairing or the substitution of a new device therefor, in addition to failure of the apparatus to function as intended.

It is an object of my invention to provide a device which is responsive to changes in liquid level.

It is another object of my invention to provide a device which will respond in the same degree to changes in liquid level irrespective of the fluid pressure within the device.

It is a further object of my invention to provide the above mentioned device with a jam-proof cam surface between the float responsive means and the switch.

Now in order to acquaint those skilled in the art with the manner of constructing and using a fluid level responsive device in accordance with the principles of my present invention, I shall describe in connection with the accompanying drawings, a preferred embodiment of my invention.

In the drawings:

Figure 1 is a vertical lengthwise view, partly in section and partly in elevation, showing the details of construction of the fluid responsive device of my present invention;

Figure 2 is an end elevational view of the device of Figure 1 with certain portions being broken away and shown in section and elevation;

Figure 3 is an enlarged vertical sectional view taken substantially on the line 3—3 of Figure 2;

Figure 4 is a view taken substantially on the line 4—4 of Figure 3; and

Figure 5 is a horizontal view taken substantially on line 5—5 of Figure 4.

Referring now to the drawings, there is shown a fluid level responsive device comprising a main float chamber 10 having openings 21 at the top and bottom portions thereof. Within the chamber 10 a float 11 is positioned for movement in accordance with the change in level of the water therein. Secured as by bolts 22 to one side of the chamber 10 in communication therewith, is an extension chamber 16, on which a bellows base 25 is mounted as by cap screws 23 adjacent the top portion thereof. Disposed between the float chamber 10 and the extension chamber 16 and between the bellows base 25 and the extension chamber 16 are annular gaskets 50 and 51 respectively, for preventing the escape of fluid therefrom. Disposed on top of the base 25 is a bellows housing 17, to the top of which a switch housing 18 is secured as by screws 24.

The float 11 disposed in chamber 10 is fixed to one end of a connecting rod 12 which is threaded at its other end to the lower end of a float rod 14. Movement of the float 11 in response to the liquid level housing 10 is transmitted through rods 12 and 14 to the switch control mechanism, indicated generally by reference numeral 13 contained within housing 17.

The rod 14 extends through opening 19 formed in the bellows base 25 and the rod 14 at its upper end is provided with a flange 15 between the bottom surface of which and the portions of the bellows base 25 surrounding the opening 19, a bellows 20 of known construction is suitably secured in fluid tight relation so as to prevent steam and water in float chamber 10 and the extension 16, from entering the housing 17 containing the switch control mechanism.

Formed integrally with the bellows base 25 are a pair of horizontally spaced apart vertically upwardly extending post members 26. A pair of horizontal inwardly extending substantially aligned pivot pins 27 are disposed in openings formed in the upper portion of each post member 26, and are secured therein by means of set screws 28. The pivot pins 27 as best shown in Figure 1, each have a substantially 90° groove cut lengthwise therein and are positioned with the groove facing downward for a purpose to be hereinafter described.

Mounted to the upper surface of the flange 15, as by a bolt 29, is a bearing bracket 30 having vertically downwardly depending legs 31. In the lower end of each leg 31 an opening 32 is formed and each opening has a substantially V-shaped tongue portion 33 projecting inwardly thereof. The tongue portions 33 of the depending legs 31 as shown, are disposed within the grooves formed in each aforedescribed pivot pin 27, to provide substantial line contact between the inner edges of the tongue portions 33 and the apices of the grooves in pins 27. The pins 27 and tongue 33 thus form an anti-friction pivot for the bracket 30. The bracket 30 further has a pair of vertically upwardly extending arms 34 extending transversely of the legs 31 thereof. Rigidly secured to one of the arms 34, as by a rivet, is a lever 35 substantially of C-shape, as viewed in plan.

Disposed adjacent the bellows 20 and secured to the bellows base 25 by means of one of the cap screws 23 is a bracket member 36. Pivotally mounted to the bracket 36 as at 53, is a cam lever 37 formed by a pair of riveted strap members substantially right angle in shape and having the intermediate portions thereof in face to face abutting relation. The ends of the straps pivoted to bracket 36 are bent away from each other to form a yoke, the arms of which and the adjacent arms of the brackets 36 receive a pivot pin. An elongated opening 38 formed in the intermediate portions of one leg of lever 37 disposed between the arms of the aforedescribed C-shaped lever 35. A pin 39 having an enlarged head portion extends through aligned apertures formed in the legs of the C-shaped lever 35 and the oblong opening 38, the leg of lever 37 being disposed therebetween so as to provide a lost motion connection between the link 35 and the lever 37. A conventional cotter pin extends through the end of pin 39 opposite the enlarged head portion thereof for retaining the pin in the position described.

The other leg of lever 37 lies above bracket 30 and the outer ends of the strap members thereat are bent to form a yoke portion 40 between which a switch actuating cam 41 is mounted. The cam 41 is supported between the arms of yoke 40 by a pivot pin 42. A cap screw 43 having an eccentric portion is disposed through openings formed in the yoke portion 40 and the central portion of the cam 41. By turning the screw 43 with a screw driver or similar tool, it is possible to secure the cam 41 in various adjusted positions relative to the cam lever 37. The cam 41 at its upper surface is adapted to contact a switch arm 44 of a conventional switch 45 for actuation thereof.

The arrangement between the switch arm 44 and cam 41 is such that the cam surface 45 of the cam will not jam or wedge with the switch arm 44. The high portion of the cam surface 45 is such that it is effective to trip the switch and, in the event of further continued movement of the cam, the following portion of the cam surface is formed so that it does not cause any substantial further movement of the switch arm. In other words, the cam surface is proportioned relative to the throw of the switch arm so that the cam surface regardless of its position relative to the switch arm will not dispose the latter to a position beyond the limits of its throw. It will be observed that the cam 41 has an effective pivotal center about the axis defined by pin 53, and the cam surface 45 is appropriately formed to achieve the aforedescribed mode of operation. Of course, the switch is constructed so that for the desired increment of movement of the cam, as will be hereinafter described, the switch arm is caused to be moved sufficiently to open or close the switch as the case may be in response to the liquid level in float housing 10. Such movement of the switch arm to effect opening or closing of the switch, as the case may be, does not constitute the full throw of the switch arm but rather a sufficient additional increment of movement may occur within the limits capable of being effected by the cam surface 45 without jamming of the switch arm with the switch which would in turn jam or wedge the cam therewith.

The following is a description of the operation of the aforedescribed fluid level responsive device:

When the liquid level in the float housing 10 is normal, the rod 12 of float 11 extends substantially horizontally and the several parts occupy the positions shown in Figures 1 through 5.

When the liquid level falls below the desired predetermined level, the float 11 also falls, and by means of rods 12 and 14 the downward movement of the float 11 is translated into limited counter-clockwise rotary movement of the bracket 30 about the pivot pins 27. Such movement of bracket 30 causes the pin 39 to slide downwardly in the slot 38 while at the same time forcing the cam lever 37 to the left causing it to rotate counter-clockwise about pivot 53. The cam 41 is thus rotated counter-clockwise forcing the switch arm 44 upwardly.

Upon upward movement of the switch arm 44 the circuit in which the switch is connected may either be adapted to be opened or closed. If the switch is connected to a feed-water pump or make-up water pump, the switch would be adapted to close the circuit while if connected to an oil blower or forced draft fan the switch would be adapted to open the circuit.

When the water level rises in the float housing 10 the float 11 rises also and by means of rods 12 and 14 the vertical movement of the float 11 is translated into clockwise rotary movement of the bracket 30 about the pivot pins 27. The rotary movement of bracket 30 causes the pin 39 to slide upwardly in the slot 38 while at the same time forcing the cam lever 37 to the right causing it to rotate clockwise about pivot 53. The cam 41 is thus rotated downwardly allowing the switch arm 44 to move downward with it. The downward movement of the switch arm 44 either opens or closes the circuit depending on what equipment the switch is connected to, as described above.

The valve of my present invention is so constructed that under low pressure conditions in the housing 10, the bellows 20 may contract an amount so that the upper arcuate edges of the openings 32 formed in the bracket 30 rest one on each of the upper arcuate edges of the pins 27. Under high pressure conditions in the housing 10 and extension 16 the bellows 20 may expand to a position at which the tongue portions 33 of the bracket 30 are caused to engage one with each of the downwardly facing grooves formed in the pins 27.

It will be thus seen that when the pressure is low the pins form a journalled support for the bracket 30 and when the pressure is high, the tongue portions 33 have substantially line contact with the grooves in the pins 27. This construction reduces the friction between the bracket 30 and pins 27 to a minimum thus permitting the fluid responsive device to remain responsive to changes in liquid level in chamber 10 regardless of the pressure in the system.

Also, as previously related, the arrangement is such that the cam 41 in the limits of its travel is such that it cannot wedge or bind with the switch arm 44. By virtue of this construction the switch will be responsive to control the control circuit in which the switch is connected in response to the liquid level in float chamber 10.

While I have shown and described what I consider to be a preferred embodiment of my invention, it will be understood that various modifications may be made therein without departing from the spirit and scope of my invention.

I claim:

1. A fluid level responsive device comprising a housing, a float mounted in said housing at one end of a substantially horizontally extending connecting rod, a substantially vertical float rod connected at its lower end to the other end of said connecting rod, a flange at the upper end of said float rod, a bracket secured to said flange comprising a pair of downwardly depending leg portions each having an aperture formed therein adjacent the lower portions thereof, a V-shaped tongue extending upwardly and inwardly of each of said apertures, a pair of upwardly projecting fixed post members, one adjacent each of said legs of said bracket, a pair of pins having lengthwise extending downwardly facing V-shaped grooves one being received in each of said post members and extending inwardly of the apertures of said leg portions with said V-shaped tongue portions disposed in said V-shaped grooves for providing substantially horizontal line contact for said float rod, a cam lever pivotally mounted at one of its ends on said device, a cam at the other end of said cam lever, and a lost motion connection between said bracket and said cam lever for translating rotary movement of said float rod into rotary movement of said cam lever.

2. A fluid level responsive device comprising a housing, a float mounted in said housing at one end of a substantially horizontally extending connecting rod, a substantially vertical float rod connected at its lower end to the other end of said connecting rod, a flange at the upper end of said float rod, a bracket secured to said flange comprising a pair of downwardly depending leg portions each having an aperture formed therein adjacent the lower portions thereof, a V-shaped tongue extending upwardly and inwardly of each of said apertures, a pair of upwardly projecting fixed post members, one adjacent each of said legs of said bracket, a pair of pins having lengthwise extending downwardly facing V-shaped grooves being received in each of said post members and extending inwardly of the apertures of said leg portions with said V-shaped tongue portions disposed in said V-shaped grooves for providing substantially horizontal line contact for said float rod, a cam lever pivotally mounted at one of its ends on said device, a switch actuating cam at the other end of said cam lever, a switch having a movable switch arm disposed in position to be engaged by a cam surface of said switch actuating cam, said cam surface and said switch arm being arranged so that said cam surface in any position thereof is ineffective to move said switch arm beyond the range of free movement of the latter, and a lost motion connection between said bracket and said cam lever for translating rotary movement of said float rod into rotary movement of said cam lever.

3. A fluid level responsive device comprising a main chamber and an extension chamber secured to one side thereof in communication therewith; a float mounted in said main chamber at one end of a substantially horizontally extending connecting rod, a substantially vertical float rod connected at its lower end to the other end of said connecting rod and projecting through an opening in the upper portion of said extension chamber, a flange at the upper end of said float rod above the opening in said extension housing, a bracket secured to said flange, a bellows secured at its one end to the lower surface of said flange and at its other end adjacent the upper portions of said extension chamber for closing said opening, said bracket comprising a pair of downwardly depending leg portions each having an aperture formed therein adjacent the lower portions thereof, a V-shaped tongue extending upwardly and inwardly of each of said apertures, a pair of upwardly projecting fixed post members, one adjacent each of said legs of bracket, a pair of pins having lengthwise extending downwardly facing V-shaped grooves one being received in each of said post members and extending inwardly of the apertures of said leg portions with said V-shaped tongue portions disposed in said V-shaped grooves for providing substantially horizontal line contact for said float rod, a cam lever pivotally mounted at one of its ends on said device, a switch actuating cam at the other end of said cam lever, a switch having a movable switch arm disposed in position to be engaged by a cam surface of said switch actuating cam, said cam surface and said switch arm being arranged so that said cam surface in any position thereof is ineffective to move said switch arm beyond the range of free movement of the latter, and a lost motion connection between said bracket and the central portion of said cam lever for translating rotary movement of said float rod into rotary movement of said cam lever.

4. A fluid level responsive device comprising a main float chamber and an extension chamber secured to one side thereof in communication therewith, a float disposed in said main float chamber and mounted on a substantially horizontally extending connecting rod which projects into said extension chamber, a substantially vertical float rod connected at its lower end to the other end of said connecting rod and projecting through an opening formed in the upper portion of said extension chamber, a horizontal bellows base mounted on the upper part of said extension chamber having a central opening therein, a flange at the upper end of said float rod above the opening in said bellows base, a bracket secured to said flange, a bellows secured at its one end to the lower surface of said flange and at its other end to said bellows base for closing said opening therein, said bracket comprising a pair of downwardly depending leg portions each having an aperture formed therein adjacent the lower portions thereof, a V-shaped tongue extending upwardly and inwardly of each of said apertures, a pair of upwardly projecting fixed post members each having an opening formed adjacent the top portion thereof with said openings being aligned, said post members being disposed adjacent each of said legs of said bracket, a pair of pins having lengthwise extending downwardly facing V-shaped grooves one being received in each of the openings in said post members and extending inwardly of the apertures of said leg portions with said V-shaped tongue portions disposed in said V-shaped grooves for providing a substantially horizontal line contact for said float rod, a cam lever pivotally mounted at its one end to a bracket mounted on said bellows base and having a yoke portion adjacent its other end, a cam secured in said yoke of said cam lever, a bolt having an eccentric portion mounted in said yoke of said cam lever with said eccentric portion being disposed in an aperture formed in the central portion of said cam for providing an adjustment whereby the position of said cam with respect to said cam lever may be adjusted, a lost motion connection between said flange and said cam lever comprising a connecting lever secured at one end to said bracket, an elongated opening formed intermediate of the top and bottom portions of said cam lever, and a pin extending through said elongated opening and secured in said connecting lever at the other end thereof.

5. A fluid responsive device comprising a housing, a float disposed in said housing and mounted for movement in response to changes in liquid level in said housing, a cam lever pivotally mounted at one of its ends on said device, a cam adjacent the other end of said cam lever, a switch having a movable switch arm disposed in position to be engaged by the cam surface of said cam for actuating said switch, means between said float and said cam lever for translating movement of said float into rotary movement of said cam lever about its pivotal mounting, said cam surface of said cam having a high portion for effecting tripping of said switch arm to a predetermined position upon rotary movement of said cam lever about its pivot, and said cam surface having a following portion ineffective for causing further movement of said switch arm substantially beyond its said predetermined position upon continued pivotal movement of said cam lever.

6. A fluid level responsive device comprising a housing, a float disposed in said housing at one end of a substantially horizontally extending connecting rod, a substantially vertical float rod connected at its lower end to the other end of said connecting rod, bracket means secured adjacent the upper end of said float rod comprising a pair of downwardly depending leg portions each having an aperture formed therein adjacent the lower portion thereof, a V-shaped tongue extending upwardly and inwardly of each of said apertures, a pair of upwardly projecting fixed post members, one adjacent each of said legs of said bracket, a pair of pins having lengthwise extending downwardly facing V-shaped grooves one being received in each of said post members and extending inwardly of the apertures of said leg portions with said V-shaped tongue portions disposed in said V-shaped grooves for providing substantially horizontal line contact for said float rod, a cam lever having a substantially vertically extending leg element and a substantially horizontally extending leg element, pivot means for pivotally mounting the lower end of said vertically extending leg element of said cam lever on said device laterally of and below the horizontal line contact for said float rod and with said horizontally extending leg element of said cam lever disposed above said bracket means, a switch actuating cam adjacent the outer end of said horizontal leg element of said cam lever, a switch having a movable switch arm disposed above said switch actuating cam in position to be engaged by a cam surface of the latter, said cam surface and said switch arm being arranged so that said cam surface in any position thereof is ineffective to move said switch arm beyond the range of free movement of the latter, and a lost motion connection between said bracket means and said cam lever for translating rotary movement of said float into rotary movement of said cam lever.

7. A fluid level responsive device comprising a housing, a float mounted in said housing at one end of a substantially horizontally extending connecting rod, a substantially vertical float rod connected at its lower end to the other end of said connecting rod, bracket means adjacent the upper end of said float rod, means for mounting said bracket means for movement about a substantially horizontal axis, a cam lever having a substantially vertically extending leg element and a substantially horizontally extending leg element, pivot means for pivotally mounting the lower end of said vertically extending leg element of said cam lever on said device laterally of and below the horizontal axis of said bracket means and with said horizontally extending leg element of said cam lever disposed above said bracket means, a switch actuating cam adjacent the outer end of said horizontal leg element of said cam lever, a switch having a movable switch arm disposed above said switch actuating cam in position to be engaged by a cam surface of the latter, said cam surface and said switch arm being arranged so that said cam surface in any position thereof is ineffective to move said switch arm beyond the range of free movement of the latter, and a lost motion connection between said bracket and said cam lever for translating rotary movement of said float rod into rotary movement of said cam lever.

LEOPOLD J. KMIECIK.

REFERENCES CITED

The following references are of record in the file of this patent:

UNITED STATES PATENTS

| Number | Name | Date |
| --- | --- | --- |
| 2,098,912 | Dillman | Nov. 9, 1937 |
| 2,142,435 | Carlson | Jan. 3, 1939 |

FOREIGN PATENTS

| Number | Country | Date |
| --- | --- | --- |
| 590,002 | France | Mar. 7, 1925 |